M. A. DEES & N. W. McLEOD.
TIRE VULCANIZING MOLD.
APPLICATION FILED APR. 5, 1912.
1,114,236.
Patented Oct. 20, 1914.
3 SHEETS—SHEET 1.
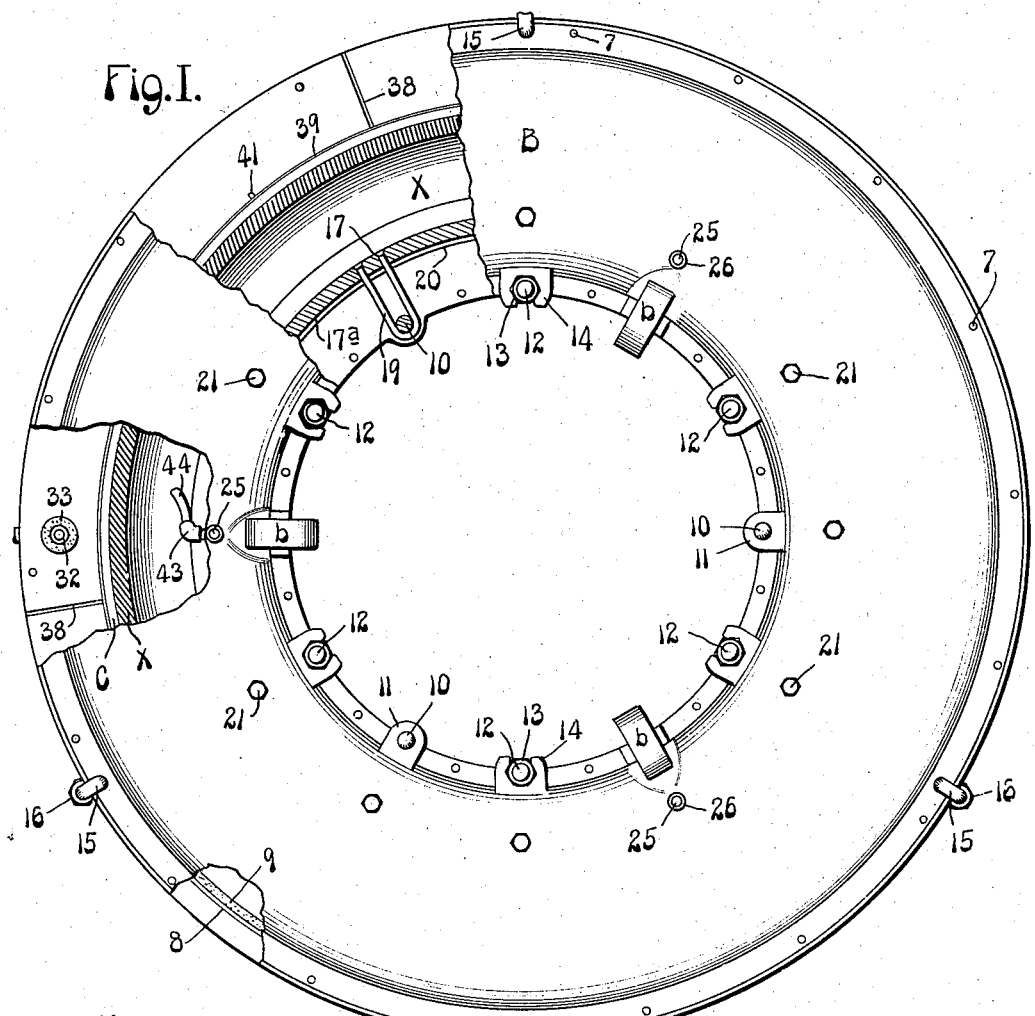
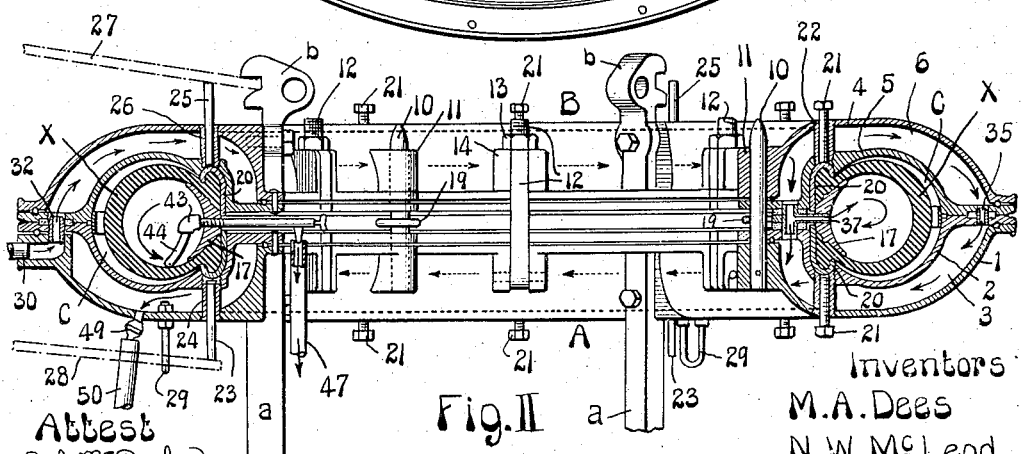
Attest
a. J. McCauley
E. B. Linn
Inventors
M. A. Dees
N. W. McLeod
by Knight Cook Attys.

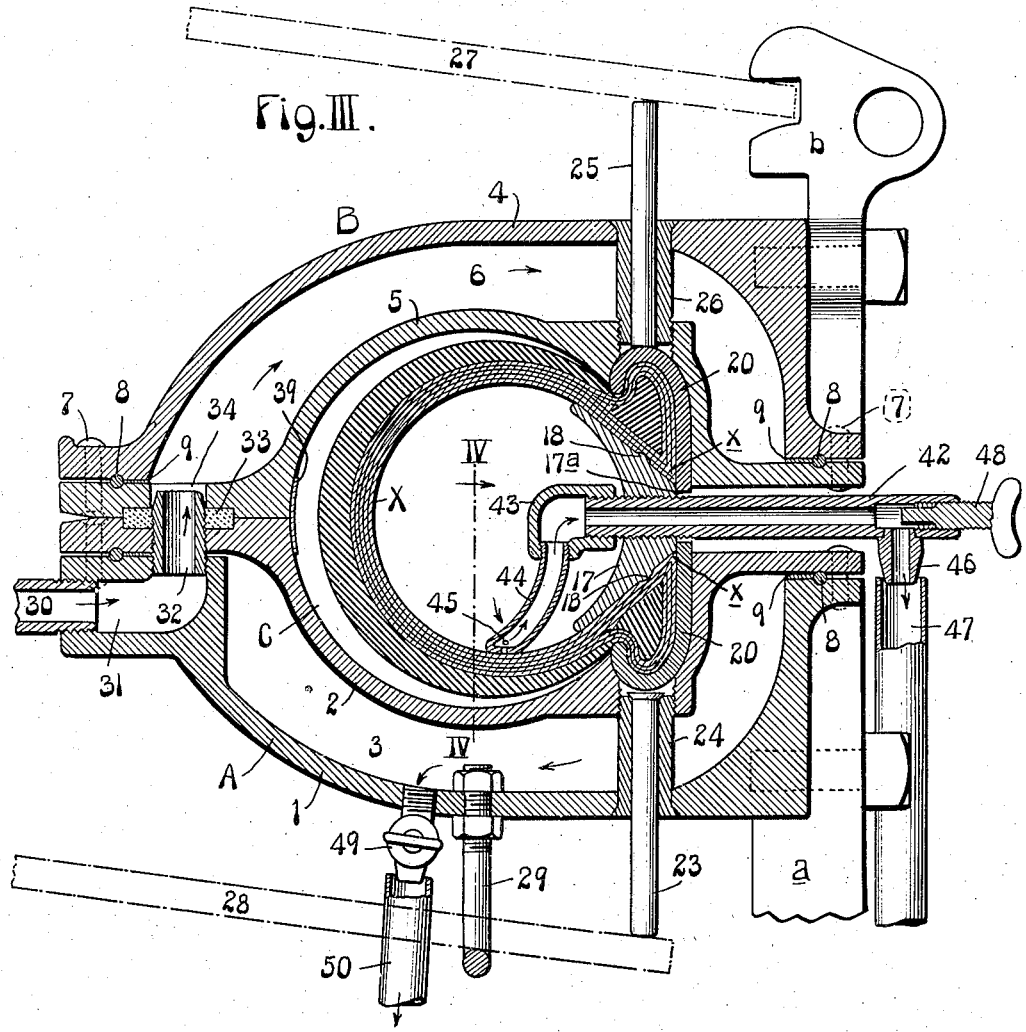
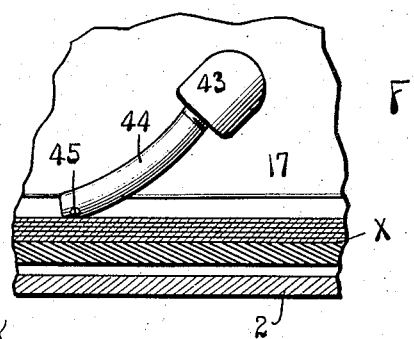

M. A. DEES & N. W. McLEOD.
TIRE VULCANIZING MOLD.
APPLICATION FILED APR. 5, 1912.
1,114,236.
Patented Oct. 20, 1914.
3 SHEETS—SHEET 3.
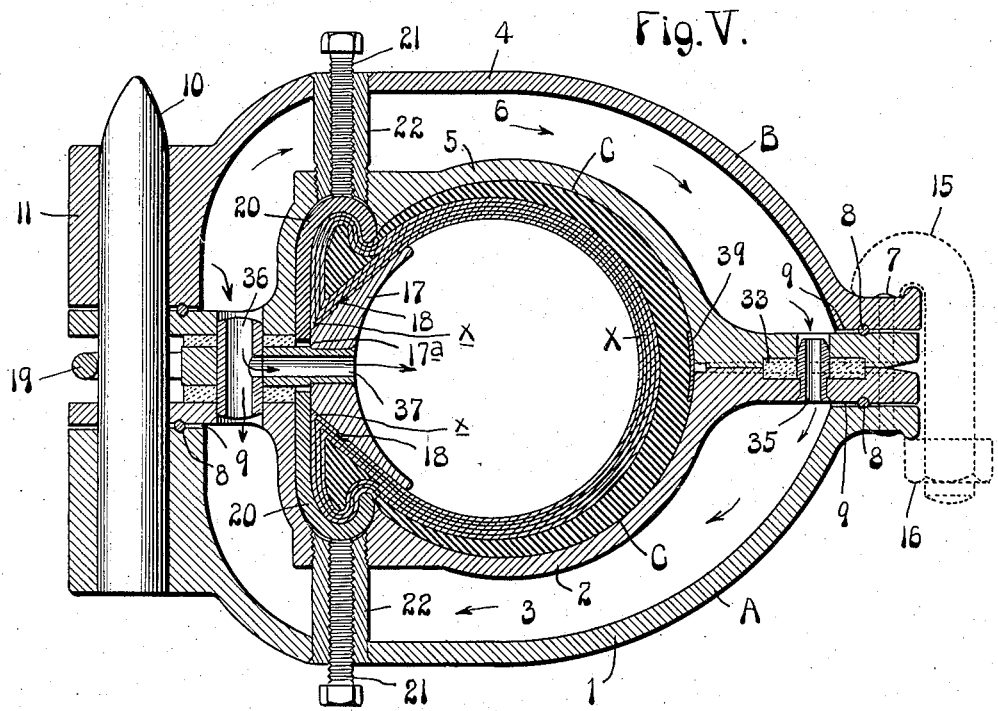
Fig. V.
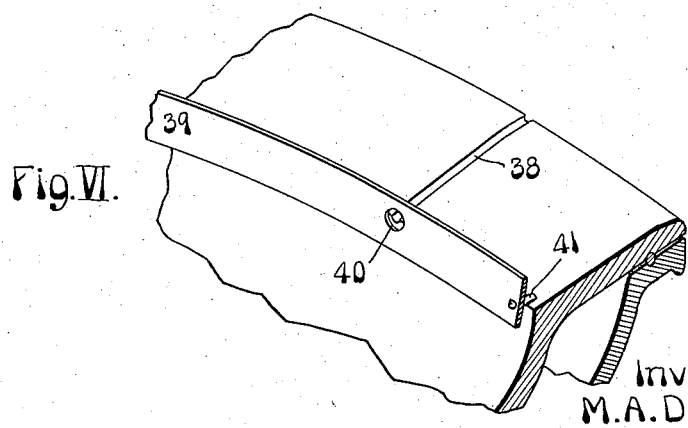
Fig. VI.
Attest
A. J. McCauley
E. B. ——
Inventors
M. A. Dees
N. W. McLeod
by Knight & Cook Attys.

UNITED STATES PATENT OFFICE.

MARK A. DEES AND NELSON W. McLEOD, OF ST. LOUIS, MISSOURI, ASSIGNORS TO AMERICAN TIRE COMPANY, OF ST. LOUIS, MISSOURI, A CORPORATION OF MISSOURI.

TIRE-VULCANIZING MOLD.

1,114,236.  Specification of Letters Patent.  Patented Oct. 20, 1914.

Application filed April 5, 1912. Serial No. 688,607.

*To all whom it may concern:*

Be it known that we, MARK A. DEES and NELSON W. McLEOD, citizens of the United States of America, and residents of the city of St. Louis and State of Missouri, have invented certain new and useful Improvements in Tire-Vulcanizing Molds, of which the following is a full, clear, and exact description, reference being had to the accompanying drawings, forming part of this specification.

Our invention relates to an apparatus for molding and vulcanizing hollow tires built up of fabric and rubber and which are structurally formed to include separated edges through the medium of which the tires may be attached to vehicle wheels. Tires of this description are commonly used as pneumatic tires, in which use the tire proper is reinforced in service by an inner inflatable tube that acts to prevent collapse of the tire.

It is very important in making tires of the kind our improvement is intended to mold and vulcanize that these tires be vulcanized under conditions that will provide maximum wearing qualities. Among the necessary requirements for the production of a highly durable tire may be mentioned the following: The green or uncured tire structure must be subjected to a high degree of pressure for the purpose of compacting and densifying the rubber in the tire before it is vulcanized, and for the further purpose of pressing the rubber and fabric into such relation with each other that, when vulcanized, the component parts of the tire structure will be positively and thoroughly cemented throughout the structure. Another necessary requirement is the readjustment of the threads of the tire fabric from the abnormal positions to which they are moved in building up the uncured tire. In building up the uncured tires having separated edges, according to the practice at present in vogue, the fabric, rubberized, and cut diagonally of its mesh, is stretched circumferentially around a suitable annular mandrel, and its side portions are then contracted at the sides of the mandrel. Such contraction of the fabric is necessary owing to the mandrel being of gradually decreasing diameter toward its inner circumference, and the contraction causes abnormal positioning of many of the fabric threads relative to others, so that if the tire is vulcanized with them so arranged, they cannot carry their proper burdens in the use of the completed tire.

The desired conditions in an unvulcanized tire cannot be obtained by the molding and vulcanizing apparatuses heretofore in use, involving the use of tire molds of solid or non-yielding tire compressing elements between which the tires are confined for the purpose of securing the requisite compression before vulcanization. Among the main reasons why the desired conditions cannot be acquired lies in the fact that the fabric is laid up of lapped strips, and it is substantially impossible to lay combined rubber and fabric tires with absolute evenness and uniformity. Consequently, when the tire is pressed between two solid or non-yielding elements, the pressure exerted by said elements is exerted in substantially the same degree throughout the tire, and those portions of the tire which may contain even slightly less material than other portions are not compressed to the same degree as the portions containing the greater amount of material. Furthermore, where the elements relied upon for compression of the tire are of solid or unyeilding nature, there is no opportunity for application of pressure to the tire structure in such manner as to adjust the various individual fabric threads, some of which require more adjustment than others.

Our invention has chiefly for its object to provide a tire vulcanizing mold by which tires of absolutely uniform density and having their components thoroughly and uniformly cemented to each other may be invariably produced, irrespective of variance in uniformity of thickness throughout the walls of tires of sizes suitable for treatment in such mold, and also whereby the fabric threads of the tire structures may be adjusted relative to each other and tensioned throughout the tire structures, and held in such adjustment and tensioned while vulcanization is taking place. In order that these objects may be effectually carried out, our apparatus is in the form of a self contained vulcanizing mold, to which the necessary vulcanizing heat may be imparted without the necessity of resorting to the usual practice of transferring a mold containing a molded tire to a heating apparatus within which it is placed to receive the necessary vulcanizing heat.

Figure I is a top or plan view of our tire vulcanizing mold, with certain portions broken out, and other portions in horizontal section. Fig. II is a vertical cross section through the mold. Fig. III is an enlarged vertical cross section, illustrating more clearly the structural features of the mold at the left hand side of Fig. II. Fig. IV is a vertical section taken on line IV—IV Fig. III. Fig. V is an enlarged vertical cross section illustrating more clearly the parts at the right hand side of Fig. II. Fig. VI is an enlarged perspective view of a fragment of the rim portion of the lower section of our mold, illustrating one of the vents therein and showing the bridging hoop at the joint between the mold sections.

In the drawings: A designates the lower shell section and B the upper shell section of our vulcanizing mold, these sections being of ring shape and in the main counterparts of each other, and being adapted to be so matched as to render them coöperative. The lower shell section is preferably supported by legs $a$ and the upper shell section is preferably supplied with parts $b$, adapted to receive suitable means for raising and lowering said top section in opening and closing the mold. The lower shell section A comprises an outer wall 1 and an inner wall 2, between which is a chamber 3, for the reception of a suitable vulcanizing agent, such as steam. The inner wall of said section is of a shape corresponding to a segment of the tire to be vulcanized and serves as a partial inclosure for a mold cavity C, in which the uncured tire X may be placed therein until it has become molded and vulcanized. The top shell section B comprises an outer wall 4, and an inner wall 5, which are of substantially the same shape as the outer and inner walls of the lower mold section. The inner wall of the top mold section, like the inner wall of the lower mold section, is of a contour corresponding to a segment of the tire X, and serves as a continuation of the inclosure for the mold cavity C. Between the outer and inner walls of the top shell section is a chamber 6 that, like the chamber 3, receives the vulcanizing agent. It is well to note at this point that the outer and inner walls of the shell sections A and B are, in view of the difficulty in coring the chambers 3 and 6 between said walls, made separately, the walls of each section being permanently connected by rivets 7, or other suitable means of fastening. It being important that fluid tight joints be supplied between the margins of the walls of the sections, we produce joints of this description by furnishing the opposing faces of the margins of the section walls with annular grooves, and lay in these grooves packing rings 8, which may be of copper, lead, or other suitable metal. Between these packing rings 8 and the chambers 3 and 6 are flat packing strips 9, which may be of rubber, or other suitable yielding material, and which, when clamped between the margins of the section walls in conjunction with the packing rings 8, serve to most effectually prevent leakage of vulcanizing agent through the joints they are intended to guard.

To provide for the accurate seating of the top shell section B on the lower shell section A to render the sections coöperable, we provide vertical dowels 10, (see Figs. I, II and V), extending upwardly from the lower section, and enter ears 11 on the top shell section. These parts are located at the inner circles of the shell sections, and while we have shown three of each of said parts, it is obvious that any other desired number of them may be utilized. The shell sections are held from separation at the inner circle of the mold and vulcanizer by draw bolts 12, preferably pivotally arranged in ears carried by the lower shell section, and equipped with nuts 13 adapted to bear on lugs 14 carried by the top shell section and into which the draw bolts may be fitted. The shell sections are clamped together at their peripheral marginal edges by any suitable means, the means we have shown for this purpose being hook bolts 15, the hooks of which are adapted to engage the marginal edge of the one shell section, while the edge of the other shell section is engaged by nuts 16 fitted to said hook bolts.

17 designates an annular packing abutment interposed between the separated edges of the tire X and, therefore, located within the mold cavity C. This abutment when made and used with a tire of the type shown, has sloping sides corresponding to the sloping inner faces of the tire. The abutment 17 provides means whereby the separated edges of the tire may be clamped and held between it and elements at the outer sides of the tire to produce a fluid tight joint between the abutment and the tire edges, and also so hold said edges that the body of the tire may be expanded within the mold cavity C, to bring it into contact with the mold cavity walls; i. e., the inner walls of the shell sections A and B, while the tire edges remain stationary. To facilitate the production of a fluid tight joint between the tire and said abutment, the abutment is preferably provided at its side faces with ribs 18, which enter slightly into the structure of the tire when it is subjected to pressure. The abutment 17 is properly adjusted and maintained in its proper position, relative to the elements in the mold cavity that receive the separated edges of a tire, by alining devices that preferably comprise loops 19 carried by the abutment and extending between the shell sections A and B at the inner circle of the vulcanizer, and each of which is of such dimensions as to accurately fit one of the dowels 10, as most clearly seen in Figs. I, II and III.

The separable edges of a tire of the kind intended to be molded and vulcanized in our apparatus are highly important features of such a tire for the reason that it is through the medium of these separate edges that the tire is secured to a wheel on which it is of service. The separated edges, whether of the bead form shown in our drawings, or of any other desired form, should—for their best utility—be properly shaped and thoroughly compressed previous to the vulcanization of the rubber entering into such edges. It is also important that the means utilized for compression of the edges be such as to avoid deformation of the edges during the application of the devices for forming them previous to vulcanization, during the adjustment of the edge formers and during the removal of the tire after it has been vulcanized.

One of the essential features of construction in our present apparatus is means whereby the uncured tire edges may be first properly shaped, formed, compressed, and then held during vulcanization, and which may be separated from the tire without damage thereto. This means is shown in the drawings utilized for producing edge beads such as those commonly present on what are known as "clencher" tires, and comprises the following elements: 20 designates edge compressor rings which, when used for operation upon clencher tire beads, are made of J-shape in cross section, and are slidably fitted against vertical portions at the inner circle of the inner walls of the shell sections A and B. The hook portions of these rings are designed to engage the outer faces of the tire edges, and when the rings are adjusted inwardly toward each other, said hook portions approach each other to compress the edges of the tire between them and the annular abutment 17. In such adjustment of the compressor rings, the inner face of the tire is pressed tightly against the abutment and, therefore, the hereinbefore mentioned fluid tight joint between the abutment and tire is effected simultaneously with the compression of the edges of the tire. The bodies of the compressor rings are arranged parallel with the inner flat face 17ª of the annular abutment 17 when the uncured tire is originally placed in the vulcanizing apparatus and, consequently the inner edges of these rings extend beyond the innermost corners $x$ of the tire edges and maintain such position while the rings are being adjusted interiorly of the vulcanizing apparatus to compress the tire edges they contact with without the least liability of such edges being injured, or the material in the tire edges being expressed past the rings during the adjustment.

The means we provide for adjusting the tire edge compressor rings 20 are operable through the shell sections A and B of the vulcanizing apparatus, and preferably comprise adjusting screws 21, which are arranged in sleeves 22 extending through the inner and outer walls of the shell sections directly opposite the edge compressing rings. The edge compressor rings 20 of our vulcanizing apparatus being independent of the shells A and B may be readily applied to the green tire that is to receive them, previous to the placing of the tire in the mold cavity of the apparatus, and it will be apparent that when the vulcanized tire is removed, these rings may be readily stripped from the edges of the tire without the least injury or deformation of such edges.

To facilitate removal of vulcanized tires from our apparatus, in view of the tendency of the tires to adhere to the walls of the mold cavity, we incorporate in the apparatus means comprising presser pins 23 and 25 extending, respectively, through the lower and top shell sections A and B opposite the edge compressor rings 20. These presser pins are slidably mounted in sleeves 24 and 26 in the shell walls, and their inner ends are adapted to contact with the compressor rings. In releasing the top shell section, pressure is exerted against the pins 25 by the employment of suitable levers, such as that indicated at 27 in the drawings, which, by being fulcrumed upon the pins 25, and seated in a notch in the parts $b$, will act to elevate the top shell section, and at the same time detach the tire therefrom. Levers 28 may be fulcrumed in stirrups 29 depending from the lower shell section A, and, by exerting force against the pins 23, cause said pins to force the opposing edge compressor ring 20 upwardly, whereby the tire is released from the mold wall of the lower shell section.

The vulcanizing agent used in our apparatus is preferably steam and, without limiting ourselves to this particular vulcanizing agent, we will, in the succeeding description, allude to steam only as the agent used. The steam is delivered to the lower shell section through a conducting pipe 30 that communicates with an inlet 31 in the lower shell section at its outer margin, (see Figs. II and III). From this inlet the steam passes through a nipple 32 secured to the lower shell section and surrounded by a gasket 33, the steam entering the chamber 6 in the top shell section through an opening 34 that receives said nipple. The steam then circulates fully in the chamber in the upper section by flowing in opposite courses therethrough. At another point in the apparatus, preferably one diametrically opposite the one at which the steam enters, is a second nipple 35 surrounded by a gasket and extending above the outer margin of the lower shell section. This nipple 35 furnishes communication between the top shell section and the lower shell section, in order that the steam may pass from the former to the latter to circulate therein to as full a degree as it is circulated in the top section. Provision is also made for the passage of steam from the top shell section to the lower shell section at the inner margin of the apparatus adjacent to and opposite the abutment 17. This communication is furnished by a short pipe 36. The pipe 36 has communication with a tube 37 that extends therefrom to and through the annular abutment 17 whereby steam is delivered into the tire to be vulcanized while it is confined in the mold chamber C. This arrangement provides for the fluid utilized for supplying the vulcanizing heat in the shell chambers 3 and 6 being also utilized in the mold cavity to expand and compress the tire, and vulcanize the inner portion of the tire. The pressure thus applied to the tire is derived before the rubber in the tire has become cured or set, and is continued until the tire is completely vulcanized. It will be obvious that when steam is employed as a medium for expanding and compressing the tire as herein contemplated, the tire may be lined in any suitable manner to obviate deleterious action upon the tire by the contact of steam therewith.

We desire to particularly note that the cross sectional area of the mold cavity C is greater than the cross section of a tire to be vulvanized in our mold, and that the difference in these cross sections is necessarily of such a degree that the uncured tire structure will be expanded and stretched before it contacts with the mold cavity wall to be compressed thereagainst. This is important, in order that the fabric threads in the tire structure will be thoroughly adjusted relative to each other and tensioned, previous to the vulcanization of the tire, thereby causing each thread to assist the other threads in resisting strains incident to the service of the completed tire, without the rubber component of the tire being stretched to be easily punctured, or otherwise injured.

In order that there may be no air, or other fluid resistance to the expansion and compression of the tire structure as it is being placed in contact with the mold cavity wall and thereafter, during vulcanization, we furnish our vulcanizing apparatus with vents that lead from the mold cavity to the atmosphere. These vents, indicated at 38, are located in the outer facing marginal portions of the inner walls of the shell sections A and B, and are seen most clearly in Figs. I and VI. While the vents just referred to are necessary for the reason stated, it is important that provision be made to prevent expression of the rubber in the tires between the outer marginal portions of the shell sections, aside from the vents, and to avoid such expression, we may use a guard strip 39, preferably of hoop form, which occupies a position in the mold at the cavity at the joint between the meeting faces of the outer marginal portions of the shell sections. This guard strip is provided with apertures 40 in registration with the vents 38, and the strip is supported by any suitable means, such as pins 40, which rest on the lower shell section, (see Fig. VI).

To gain the most satisfactory action of steam used for the expansion and compression of the tires treated in our mold, it is very necessary that the water of condensation which collects at the interior of the tires be removed as rapidly as it collects, in order that the entire inner face of the tire may be constantly subjected to the action of live steam, instead of being partially subjected to the liquid resulting from condensation of the steam. We, therefore, provide means whereby the water of condensation is exhausted from a tire as rapidly as it collects therein, and which includes a drain pipe 42 extending through the annular abutment 17. This drain pipe has loosely fitted to it at its inner end a swivel 43 which carries an exhaust pipe 44 that constantly rests upon the wall of the tire which is lowermost in the mold cavity C. The exhaust pipe 44 is preferably closed at its lower end, and contains small perforations 45, through which the water of condensation collecting at the bottom of the space in the tire may be forced by the pressure of steam against such water. The exhaust pipe being supported by a swivel follows the wall of the tire as it moves toward the wall of the mold cavity, and, consequently, remains in contact with said tire wall to provide for the expulsion of water through the pipe, and into the drain pipe 42 to be discharged from the latter, preferably through a nipple 46 into a conducting pipe 47. The drain pipe 42 may, when desired, be closed, or partially closed, by a valve 48. Water of condensation is removed from the vulcanizing agent chamber or chambers of our mold and vulcanizer through one or more cocks 49 that may empty the water into a conducting pipe 50.

In conclusion, we wish to emphasize the particular salient feature in our mold of the mold cavity C being of greater cross sectional area than the cross sectional area of an uncured tire placed in the cavity, and to add that the cross sectional area of the mold is greater than the cross section of the uncured tire to a degree that will permit of the tire being expanded to an extent similar to the extent it would be expanded to under air pressure and load when in service. Further, that the degree of expansion permissible by the difference in area of the mold cavity and cross section of the tire should be sufficient to provide for a maximum stretching of the fabric in the tire before vulcanization of the rubber takes place, in order that the rubber may be in a normal state in the tire and the fabric under the same strain, when it is placed in service and subjected to the force of air inflation, as it is before it is subjected to such force.

We claim:—

1. In a tire vulcanizing mold, tire incasing mold sections, independently movable rings operable to compress the edges of the tire, said rings being confined within the mold sections, and means for adjusting said rings independently of each other.

2. In a tire vulcanizing mold, tire incasing mold sections, independently movable rings confined within said mold sections, said rings having no direct connection with each other, and means for operating said rings to compress the edges of the tire.

3. A mold for tires having separated edges, comprising mold cavity sections within which a tire may be confined, compressor rings within the mold cavity, an abutment between which and said compressor rings the edges of the tire may be clamped, and means extending through one of said mold sections for adjustment of said compressor rings toward said abutment.

4. In a tire vulcanizer, mold sections adapted to surround and completely inclose a tire having separated edges, a pair of tire edge compressing rings inclosed by said mold sections, and means for adjusting said rings independently of the mold sections.

5. In a tire vulcanizer, mold sections adapted to surround and completely inclose a tire having separated edges, a pair of tire edge compressing rings inclosed by said mold sections, and means for adjusting said rings independently of the mold sections; said ring adjusting means being operable at the exterior of the mold.

6. In a tire vulcanizer, mold sections adapted to surround and incase a tire having separated edges, and a pair of tire edge compressing rings incased by said mold sections, said mold sections having transverse openings which extend from said compressing rings to the exterior of the mold for the purpose described.

7. In a tire vulcanizer, mold sections adapted to surround and incase a tire, having separated edges, a pair of tire edge compressing rings incased by said mold sections, said mold sections having openings which extend from said compressing rings to the exterior of the mold, and adjusting devices, passing through said openings, for moving said rings independently of said mold sections.

8. In a tire vulcanizer, mold sections adapted to surround and incase a tire having separated edges, a pair of tire edge compressing rings arranged between said mold sections, and screws fitted to said mold sections for adjusting said rings independently of said mold sections; said screws being operable from the exterior of said mold sections.

9. In a mold for vulcanizing tires having separated edges, an annular abutment adapted to be confined between the edges of the tire, tire incasing sections providing a mold cavity for the tire, compressor rings engaging the edges of the tire and slidably fitted to the inner face of said abutment, and means for adjusting said compressor rings independently of each other along the inner face of said abutment.

10. In a mold for vulcanizing tires having separated edges, an annular abutment adapted to be confined between the edges of the tire, tire incasing sections providing a mold cavity for the tire, compressor rings engaging the edges of the tire and operable in contact with the inner face of said abutment, and means operable through said incasing sections for adjustment of said compressor rings independently of each other along the inner face of said abutment.

11. In a tire vulcanizer, a mold adapted to incase a tire having separated edges, said mold having a tire receiving opening larger than the unvulcanized tire, means for producing a steam tight joint at the edges of the tire, means for introducing steam into the tire to expand it, and an outlet device for allowing steam to escape from the interior of the tire; said outlet device including a loosely swiveled exhaust pipe adapted to lie on the inner face of the tire.

12. In a mold for vulcanizing tires having separated edges, tire incasing sections providing a tire receiving mold cavity, an annular abutment adapted to be seated between the edges of the tire, means for introducing fluid direct into said tire to expand it, and a drain device in part loosely arranged in the mold cavity, adapted to follow the tire during its expansion.

13. In a mold for vulcanizing tires having separated edges, tire incasing sections providing a tire receiving mold cavity, an annular abutment adapted to be seated between the edges of the tire, means for introducing fluid direct into said tire to expand it, and a drain device in part loosely arranged in the mold cavity, adapted to follow the tire during its expansion; said drain device comprising a drain pipe extending through said abutment, and an exhaust pipe swiveled to said drain pipe at its inner end.

14. A tire vulcanizing mold comprising mold sections within which a tire having separated edges may be confined, an abutment ring, compressor rings within the mold for compressing the edges of the tire against said abutment ring, and presser pins operable through said mold against one of said compressor rings to release the tire after it is vulcanized.

15. A tire vulcanizing mold comprising mold sections within which a tire may be confined, and a guard strip bridging the joint between the marginal edges of said mold sections; said guard strip being apertured to permit vent of air or gases from the mold cavity to the exterior of the mold.

16. A tire vulcanizing mold comprising mold sections having marginal edges grooved to provide a vent and a guard strip bridging the joint between said marginal edges, the said guard strip being provided with an aperture registering with said vent.

MARK A. DEES.
NELSON W. McLEOD.

In the presence of—
A. J. McCAULEY,
E. B. LINN.